(12) United States Patent
Yoshimitsu

(10) Patent No.: US 8,363,385 B2
(45) Date of Patent: Jan. 29, 2013

(54) SOLID ELECTROLYTIC CAPACITOR AND METHOD OF MANUFACTURING THEREOF

(75) Inventor: Satoru Yoshimitsu, Saga (JP)

(73) Assignees: SANYO Electric Co., Ltd., Moriguchi-shi, Osaka (JP); SAGA SANYO INDUSTRIES Co, Ltd., Saga (JP)

( * ) Notice: Subject to any disclaimer, the term of this patent is extended or adjusted under 35 U.S.C. 154(b) by 143 days.

(21) Appl. No.: 12/947,959

(22) Filed: Nov. 17, 2010

(65) Prior Publication Data

US 2011/0122545 A1   May 26, 2011

(30) Foreign Application Priority Data

Nov. 20, 2009   (JP) ................................. 2009-265321

(51) Int. Cl.
  *H01G 9/00*   (2006.01)
(52) U.S. Cl. ........ 361/523; 361/516; 361/519; 361/525; 361/528; 361/529

(58) Field of Classification Search ................. 361/523, 361/516–519, 525–529, 540–541, 503–504; 29/25.01, 25.03
See application file for complete search history.

(56) References Cited

U.S. PATENT DOCUMENTS

| 5,972,052 | A  | * | 10/1999 | Kobayashi et al. | .......... 29/25.03 |
| 7,746,623 | B2 | * | 6/2010  | Murakami et al.  | ............ 361/523 |

FOREIGN PATENT DOCUMENTS

| JP | 2001-176758 A | 6/2001 |
| JP | 2008-283136 A | 11/2008 |

* cited by examiner

*Primary Examiner* — Nguyen T Ha
(74) *Attorney, Agent, or Firm* — Westerman, Hattori, Daniels & Adrian, LLP

(57) ABSTRACT

A solid electrolytic capacitor having a high heat resistance is provided. The solid electrolytic capacitor according to the present invention includes an anode body having a surface on which a dielectric film is formed, and a conductive polymer layer formed on the dielectric film. The conductive polymer layer includes an aromatic sulfonic acid ion and an NHPA compound ion.

7 Claims, 1 Drawing Sheet

SOLID ELECTROLYTIC CAPACITOR AND METHOD OF MANUFACTURING THEREOF

This nonprovisional application is based on Japanese Patent Application No. 2009-265321 filed on Nov. 20, 2009 with the Japan Patent Office, the entire contents of which are hereby incorporated by reference.

BACKGROUND OF THE INVENTION

1. Field of the Invention

The present invention relates to a solid electrolytic capacitor and a method of manufacturing the solid electrolytic capacitor, and particularly to a solid electrolytic capacitor having high heat resistance and a method of manufacturing the solid electrolytic capacitor.

2. Description of the Related Art

In recent years, electronic devices have been digitized and increased in frequency, which requires a compact and large-capacity solid electrolytic capacitor having a low impedance even in a high frequency region.

As a solid electrolytic capacitor satisfying the above-described requirement, a wound-type solid electrolytic capacitor has been developed. The wound-type solid electrolytic capacitor has a configuration in which a conductive polymer layer as a solid electrolyte is formed in a gap between an anode body and a cathode body which are wound with a separator interposed therebetween. The wound-type configuration as described above allows implementation of a compact and large-capacity solid electrolytic capacitor.

Furthermore, in the solid electrolytic capacitor, polymers such as polypyrrole and polythiophene having high conductivity is employed for a conductive polymer layer in order to implement a decreased impedance in a high frequency region. Among others, increasing attention is now being given to polyethylene dioxythiophene exhibiting a relatively slow reaction rate and excellent adhesiveness with the dielectric film of the surface of an anode body.

Various studies have been made in order to improve the performance as a conductive polymer layer made of this polyethylene dioxythiophene. For example, Japanese Patent Laying-Open No. 2001-176758 discloses that, in order to form polyethylene dioxythiophene with reduced variations in impedance, the blending amount of each component used as an oxidizer is prepared, and then, monomers are polymerized to form a conductive polymer layer.

Furthermore, Japanese Patent Laying-Open No. 2008-283136 discloses that, in order to improve the withstand voltage of the solid electrolytic capacitor, a polymerization retardant and an ionic solution containing cations and anions are used to form polyethylene dioxythiophene.

Meanwhile, in recent years, the reflow process is more likely to be performed by lead-free solder in consideration of the harmful effect of lead. The melting point of the lead-free solder is higher than that of the conventional lead solder, which results in a high temperature such as 200° C. to 270° C. during the reflow process using lead-free solder. The reflow process performed at such a high temperature causes a problem that the conductive polymer layer is deteriorated to cause a decrease in conductivity, leading to a decrease in the performance of the solid electrolytic capacitor.

SUMMARY OF THE INVENTION

An object of the present invention is to provide a solid electrolytic capacitor having a high heat resistance and a method of manufacturing the solid electrolytic capacitor.

The present invention provides a solid electrolytic capacitor including an anode body having a surface on which a dielectric film is formed; and a conductive polymer layer formed on the dielectric film. The conductive polymer layer includes an aromatic sulfonic acid ion and a nitrogen-containing heterocyclic polyaromatic compound ion containing a nitrogen atom as a heteroatom. It is to be noted that the "nitrogen-containing heterocyclic polyaromatic compound" is hereinafter referred to as an "NHPA compound".

In the solid electrolytic capacitor as described above, it is preferable that the NHPA compound ion is at least one compound ion of benzopyrimidine, benzopyridazine, acridine, and quinoxaline, and a derivative thereof.

Furthermore, in the solid electrolytic capacitor as described above, it is preferable that a polymer forming the conductive polymer layer is polyethylene dioxythiophene.

The present invention provides a method of manufacturing a solid electrolytic capacitor including the steps of forming a dielectric film on a surface of an anode body; and forming a conductive polymer layer on the dielectric film by polymerization reaction of a monomer using the monomer, a dopant material and an NHPA compound.

In the above-described method of manufacturing a solid electrolytic capacitor, it is preferable that the NHPA compound is at least one of benzopyrimidine, benzopyridazine, acridine, and quinoxaline, and a derivative thereof.

Furthermore, in the step of forming the conductive polymer layer, it is preferable that a mole ratio (A/B) of the monomer (A) and the NHPA compound (B) is 3/0.01 or more and 3/0.04 or less.

Furthermore, in the above-described method of manufacturing a solid electrolytic capacitor, it is preferable that the dopant material is an aromatic sulfonic acid metal salt and the monomer is 3,4-ethylene dioxythiophene.

The NHPA compound used herein refers to a compound having two or more aromatic rings in its molecular structure, at least one of which contains a nitrogen atom as a heteroatom. Furthermore, a monomer which is a polymer precursor herein may not necessarily be a monomer and may include, for example, low-molecular-weight oligomers.

The present invention can provide a solid electrolytic capacitor having a high heat resistance and a method of manufacturing the solid electrolytic capacitor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
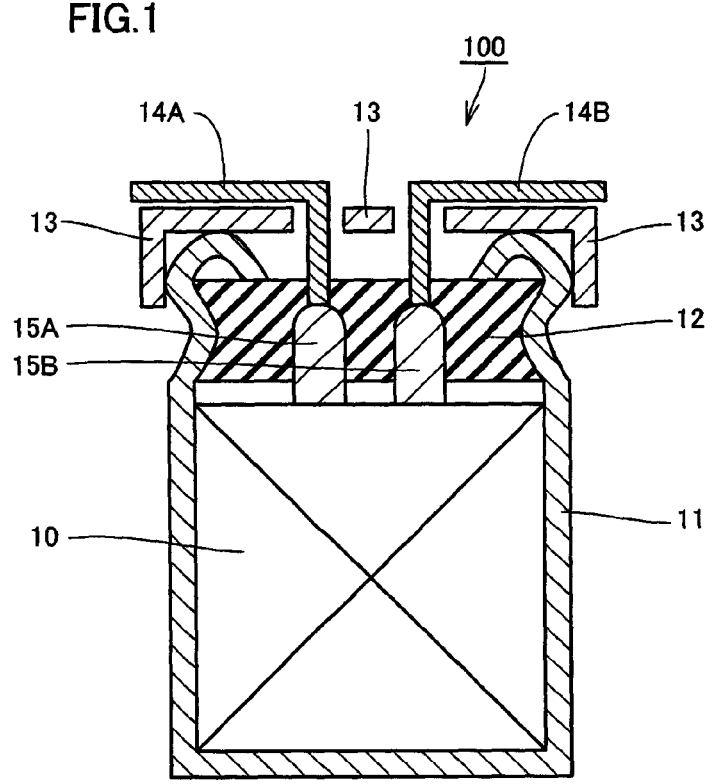
FIG. 1 is a cross sectional view schematically showing the structure of a wound-type solid electrolytic capacitor according to the present embodiment.

As a result of concentrated studies focusing attention on improving the heat resistance of the solid electrolytic capacitor, the inventor of the present invention found that a solid electrolytic capacitor having high heat resistance can be manufactured by polymerization reaction of a monomer using an NHPA compound when forming a conductive polymer layer.

The embodiments of the present invention based on the above-described findings will be hereinafter described in detail with reference to the accompanying drawings, in which the same or corresponding components in each embodiment described below are designated by the same reference characters, and description thereof will not be repeated.

Solid Electrolytic Capacitor

The configuration of the solid electrolytic capacitor according to the present embodiment will first be described.

In FIG. 1, a solid electrolytic capacitor 100 includes a capacitor element 10, a bottomed case 11, a sealing member 12, a seat plate 13, lead wires 14A and 14B, and lead tabs 15A and 15B.

Connected to capacitor element 10 are lead tabs 15A and 15B which are electrically connected to lead wires 14A and 14B, respectively. Capacitor element 10 is housed in bottomed case 11 provided with an open end on its upper surface. Capacitor element 10 is sealed within bottomed case 11 by placing, on the upper surface of capacitor element 10, sealing member 12 formed such that lead wires 14A and 14B pass therethrough. Furthermore, the vicinity of the open end of bottomed case 11 is subjected to pressing in a lateral direction and curling. Seat plate 13 is disposed in the curled portion. It is to be noted that since capacitor element 10 is complicated in cross section and has a configuration similar to that of the conventional wound-type capacitor element except for the configuration of the conductive polymer layer described later, the cross section of capacitor element 10 is not shown.

Lead wires 14A and 14B and lead tabs 15A and 15B can be made of known materials used for the lead wire and the lead tab of the solid electrolytic capacitor. Bottomed case 11 can be made of metal such as aluminum, stainless steel, copper, iron, and brass or may be made of an alloy of these metals. Furthermore, sealing member 12 may be made of any insulating material and, for example, can be made of an insulating elastic body, specifically, an insulating rubber such as silicon rubber, fluoro rubber, ethylene-propylene rubber, Hypalon rubber, butyl rubber, and isoprene rubber, which exhibit relatively high heat resistance and sealing performance.

Figure 2:
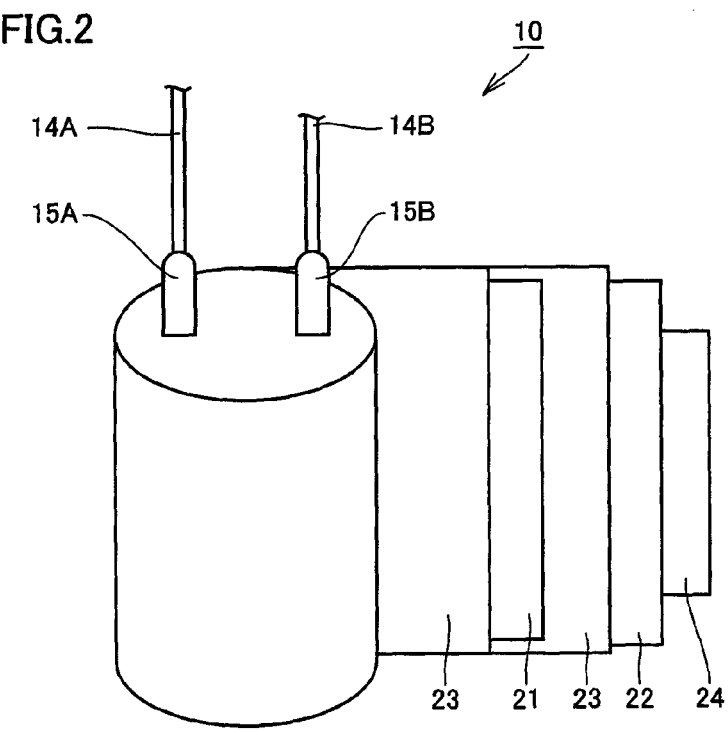
FIG. 2 is a diagram illustrating the configuration of a capacitor element according to the present embodiment.

In FIG. 2, capacitor element 10 includes an anode body 21 connected to lead tab 15A, a cathode body 22 connected to lead tab 15B, and a separator 23. Anode body 21 and cathode body 22 are integrally wound with separator 23 interposed therebetween. The outermost periphery of the wound body is secured with a securing tape 24. Furthermore, a dielectric film is formed on the surface of at least anode body 21 of anode body 21 and cathode body 22, and a conductive polymer layer which is not shown is formed on the dielectric film, that is, in a gap between anode body 21 and cathode body 22.

Anode body 21 is not particularly limited, but may be any component that is generally used for the anode body of the wound-type solid electrolytic capacitor. Anode body 21 may be configured such that a dielectric film is formed on the surface of the foil made of metal such as aluminum, tantalum and niobium, for example, having a valve action. Anode body 21 having this configuration can be fabricated by etching the surface of the foil made of metal having a valve action for roughening the surface and then subjecting the roughened surface of the foil to chemical conversion to form a dielectric film.

Cathode body 22 is not particularly limited, but may be any component that is generally used for the cathode body of the wound-type solid electrolytic capacitor. Cathode body 22 may be made of foil of metal such as aluminum, tantalum and niobium, for example, having a valve action. Anode body 21 and cathode body 22 may be made of the same or different metals.

Separator 23 is not particularly limited, but may be any component that is generally used for the separator of the wound-type solid electrolytic capacitor. Separator 23 can be made of nonwoven fabric and the like including, as a main component, synthetic cellulose, polyethylene terephthalate, vinylon, and aramid fibers, for example.

Examples of the polymer forming a conductive polymer layer may include a polymer such as polypyrrole, polythiophene, polyfuran, of polyaniline, or a derivative thereof. Since polythiophene or a derivative thereof exhibits high conductivity, a polymer made of polythiophene or a derivative thereof is preferable, and a polymer made of polyethylene dioxythiophene is particularly preferable.

Furthermore, a dopant exists in the conductive polymer layer. An example of this dopant can be an aromatic sulfonic acid ion having high mobility as a dopant in the conductive polymer layer. Examples of the preferable aromatic sulfonic acid ion include a naphthalene sulfonic acid ion, a tetralin sulfonic acid ion, an alkylbenzene sulfonic acid ion, an alkoxybenzene sulfonic acid ion, and the like. Particularly, a para-toluenesulfonic acid ion is preferable which is one of alkylbenzene sulfonic acid ions having a function of improving the initial electrical characteristics and heat resistance of the conductive polymer layer.

Furthermore, an "NHPA compound" ion exists in the conductive polymer layer. The inventor of the present invention found that the heat resistance of the solid electrolytic capacitor is improved and the equivalent series resistance (hereinafter abbreviated as "ESR") is decreased by, when forming a conductive polymer layer, employing an NHPA compound salt, that is, causing the conductive polymer layer to contain an NHPA compound ion. Although it is unclear why the NHPA compound ion contained in the polymer leads to improvement in the characteristics of the conductive polymer layer, the following assumption can be made with regard to improvement in heat resistance.

In the NHPA compound, the nitrogen atom which is a heteroatom is conjugated with another atom in the aromatic ring and brought into the state where one lone pair is included. A substituent and a proton are readily bonded to the nitrogen atom having a lone pair. When the aromatic sulfonic acid which is a dopant is bonded as a substituent to the nitrogen atom having a lone pair to form a salt of the NHPA compound and the aromatic sulfonic acid, the nitrogen atom carries a cationic charge. As described above, since the nitrogen atom is conjugated with another atom in the aromatic ring, the cationic charge produced on the nitrogen atom will be diffused into the aromatic ring and brought into the stabilized state. The NHPA compound ion having a cationic charge existing in the stabilized state in a molecule serves to stabilize the molecular structure of the polymer and prevent a dopant from being removed from the conductive polymer layer under a high-temperature environment such as during the reflow process.

Examples of the above-described NHPA compound may include benzopyrimidine, benzopyridazine, acridine, and quinoxaline, and a derivative thereof, which each have a stable molecular structure and high heat resistance. Furthermore, it is preferable to use an NHPA compound salt to form a conductive polymer layer in order to allow an NHPA compound ion to efficiently exist in the conductive polymer layer.

For example, an aromatic sulfonic acid ion can be used as an anion component which is bonded to the NHPA compound to form a salt. Examples of the aromatic sulfonic acid ion suitable for this anion component include a polycyclic sulfonic acid ion, a tetralin sulfonic acid ion, an alkylbenzene sulfonic acid ion, an alkoxybenzene sulfonic acid ion, and the like. Particularly, it is preferable to use a para-toluenesulfonic acid ion which has high heat resistance and does not impair the polymer conductivity in the conductive polymer layer.

As described above, in the solid electrolytic capacitor according to the present embodiment, an aromatic sulfonic acid ion as a dopant and an NHPA compound ion exist in the polymer forming a conductive polymer layer. Such a conductive polymer layer is high in heat resistance, which allows a solid electrolytic capacitor having a high heat resistance to be provided.

The solid electrolytic capacitor according to the present invention is not limited to the solid electrolytic capacitor according to the above-described embodiments, but can be applied to other known types. Examples of other known types may include a chip-type solid electrolytic capacitor using a sintered body made of a valve metal, a stack-type solid electrolytic capacitor using plates of a valve metal, and the like. The chip-type solid electrolytic capacitor is configured in such a manner that a conductive polymer layer is formed on a sintered body having a dielectric film. The stack-type solid electrolytic capacitor is configured in such a manner that a conductive polymer layer is formed on the plates of a valve metal having a dielectric film.

Method of Manufacturing Solid Electrolytic Capacitor

A method of manufacturing solid electrolytic capacitor 100 described above will then be described.

Process of Forming Dielectric Film

First, in accordance with the known chemical conversion method, a dielectric film is formed on the surface of anode body 21. For example, the dielectric film can be formed on the surface of the valve action metal foil by immersing the valve action metal foil in the known chemical conversion solution such as adipic acid ammonium solution and applying heat treatment or a voltage thereto.

Then, anode body 21 having a dielectric film formed thereon and cathode body 22 are wound with separator 23 interposed therebetween to fabricate a wound body secured with securing tape 24. Lead wires 14A and 14B each serving as a terminal are connected to anode body 21 and cathode body 22 through lead tabs 15A and 15B, respectively.

The number of each of lead wires 14A and 14B connected to anode body 21 and cathode body 22, respectively, is not limited as long as the number thereof is one or more. The number of each of anode body 21 and cathode body 22 may be one or may be two or more. Furthermore, the number of anode body 21 may be the same as or different from the number of cathode body 22. Anode body 21 and cathode body 22, lead tabs 15A and 15B, and lead wires 14A and 14B each can be fabricated by a known method using known materials.

It is to be noted that, for the purpose of mass production, the metal foil generally used for anode body 21 is obtained by subjecting a large-sized valve action metal foil to chemical conversion and then cutting it into a desired size. In this case, in the wound body produced by the above-described process, a dielectric film is not formed in the incision corresponding to the cutting plane of anode body 21. Accordingly, in accordance with the known chemical conversion method, a dielectric film is formed on the cutting plane of anode body 21, that is, a plane exposed by cutting but not subjected to chemical conversion.

Process of Forming Conductive Polymer Layer

The wound body subjected to chemical conversion is impregnated with a polymerization solution to form a conductive polymer layer on the dielectric film. The polymerization solution used herein refers to the entire solution used for polymerization reaction, and may be one solution or may include a plurality of solutions. For example, the polymerization solution may be one solution containing all of a monomer which is a polymer precursor, a dopant material, an oxidizer, and an NHPA compound salt. The polymerization solution may also be four solutions including a solution containing a monomer, a solution containing a dopant material, a solution containing an oxidizer, and a solution containing an NHPA compound salt. The polymerization solution may also be two or three solutions, for example, two solutions including a solution containing a monomer and a dopant, and a solution containing an oxidizer and an NHPA compound salt. It is to be noted that an oxidizer does not need to be contained in the polymerization solution.

In the present embodiment, description will be made with regard to the case where two types of solutions including a monomer solution containing a monomer and a mixed solution containing a dopant material and an NHPA compound salt (hereinafter simply referred to as a "mixed solution") are prepared as a polymerization solution.

First, the monomer solution containing a monomer and the mixed solution are prepared. The monomer may be added into the solvent, and in the case where the monomer alone is in the liquid state, the monomer itself can be used as a monomer solution. The mixed solution can be prepared, for example, by adding a dopant material to a solvent to prepare a dopant solution to which an NHPA compound salt is then added. The mixed solution is prepared in this way to allow uniform mixture of the mixed solution and the monomer solution. At least one of alcohols such as methanol, ethanol, isopropyl alcohol, n-butanol, and ethylene glycol can be used as a solvent.

Then, the wound body produced as described above is impregnated with the prepared mixed solution and further impregnated with a monomer solution. Impregnation of the wound body with each solution causes the monomer, the dopant material and the NHPA compound salt to permeate through the dielectric film, that is, through a gap between anode body 21 and cathode body 22. When each substance permeates through the gap between anode body 21 and cathode body 22 and come into contact with each other, the polymerization reaction of the monomer is developed. This polymerization reaction is a chemical polymerization reaction, and can be increased in reaction rate, for example, by applying heat.

A conductive polymer layer is formed on the dielectric film, that is, in a gap between anode body 21 and cathode body 22 in the above-described process, to thereby complete capacitor element 10. This capacitor element 10 has a configuration in which a dopant and an NHPA compound ion exist in the conductive polymer layer formed by the polymerization reaction.

In the present embodiment, a known component can be used as a monomer which can be selected as appropriate, for example, from pyrrole, thiophene, furan, and aniline, and a derivative thereof. Since polythiophene and a derivative thereof is high in conductivity, it is preferable to use a monomer made of thiophene or a derivative thereof, and particularly preferable to use 3,4-ethylene dioxythiophene forming polyethylene dioxythiophene.

Furthermore, an aromatic sulfonic acid metal salt can be used as a dopant material. Examples of the aromatic sulfonic acid forming an anion of the aromatic sulfonic acid metal salt may include a naphthalene sulfonic acid, a tetralin sulfonic acid, an alkylbenzene sulfonic acid, and an alkoxybenzene sulfonic acid. Specifically, it is preferable to use a para-toluenesulfonic acid which is one of alkylbenzene sulfonic acids having a function of improving the initial electrical characteristics and heat resistance of the conductive polymer layer. Examples of the metal forming a cation of the aromatic sulfonic acid metal salt may include iron (III), copper (II), chromium (VI), cerium (IV), manganese (VII), and zinc (II). It is particularly preferable to use iron (III).

Examples of the NHPA compound forming a cation of the NHPA compound salt may include benzopyrimidine, benzopyridazine, acridine, and quinoxaline, and a derivative thereof, which each have a stable molecular structure and high heat resistance as described above. Furthermore, examples of the compound forming an anion of the NHPA compound salt may include an aromatic sulfonic acid such as a polycyclic sulfonic acid, a tetralin sulfonic acid, an alkylbenzene sulfonic acid, and an alkoxybenzene sulfonic acid. It is particularly preferable to use a para-toluenesulfonic acid which is high in heat resistance and does not impair the polymer conductivity in the conductive polymer layer.

In this case, it is preferable that the mole ratio (A/B) of the monomer (A) and the NHPA compound salt (B) used in this process is 3/0.01 or more and 3/0.04 or less. In other words, in the present embodiment, it is preferable that the total amount of the NHPA compound in the mixed solution is 0.01 mol or more and 0.04 mol or less when the total amount of the monomer in the monomer solution is 3 mol. When the above-described mole ratio is 3/0.01 or more, it becomes possible to improve the effect of increasing the heat resistance and decreasing the ESR of the solid electrolytic capacitor by adding an NHPA compound salt. In contrast, when the above-described mole ratio is 3/0.04 or less, it becomes possible to suppress the inhibition of the polymerization reaction of the monomer and the dopant solution by the excessive NHPA compound salt and also suppress an increase in the ESR of the solid electrolytic capacitor. Furthermore, it is preferable that the mole ratio (A/C) of the monomer (A) and the dopant material (C) is 3/1.

Mounting of Capacitor Element on Bottomed Case

Capacitor element 10 produced by the above-described process is housed in bottomed case 11, and sealing member 12 formed such that lead wires 14A and 14B pass therethrough is disposed on the upper surface of capacitor element 10. Consequently, capacitor element 10 is sealed within bottomed case 11. Furthermore, the vicinity of the open end of bottomed case 11 is subjected to pressing in a lateral direction and curling, and seat plate 13 is disposed in the curled portion, with the result that solid electrolytic capacitor 100 shown in FIG. 1 is produced.

According to the method of manufacturing a solid electrolytic capacitor in accordance with the above-described embodiments, in addition to the aromatic sulfonic acid ion as a dopant, an NHPA compound ion exists in the conductive polymer layer. Accordingly, the molecular structure of the polymer forming a conductive polymer layer is stabilized and the NHPA compound ion can function as a dopant in the conductive polymer layer. Therefore, the solid electrolytic capacitor manufactured in the present embodiment can be configured to exhibit a low ESR and a high heat resistance.

The method of manufacturing a solid electrolytic capacitor according to the present invention is not limited to the case of manufacturing the solid electrolytic capacitor according to the above-described embodiments, but can be applied to the method of manufacturing the solid electrolytic capacitor of other known types. Examples of other known types may include a chip-type solid electrolytic capacitor using a sintered body made of a valve action metal, a stack-type solid electrolytic capacitor using plates of a valve metal, and the like. The chip-type solid electrolytic capacitor is configured in such a manner that a conductive polymer layer is formed on a sintered body having a dielectric film. The stack-type solid electrolytic capacitor is configured in such a manner that a conductive polymer layer is formed on the plates of a valve metal having a dielectric film.

Furthermore, although the formation of the conductive polymer layer by chemical polymerization has been described in the present embodiment, the conductive polymer layer may be formed by electrolytic polymerization.

EXAMPLES

Example 1

First, aluminum foil was immersed in the adipic acid ammonium solution and a voltage was applied thereto, thereby forming a dielectric film on the surface of the aluminum foil. Then, the aluminum foil having this dielectric film formed thereon was cut to produce anode body 21. An aluminum foil as anode body 21 and an aluminum foil as cathode body 22 were wound with the synthetic cellulose fiber as separator 23 interposed therebetween, and secured with securing tape 24 to produce a wound body.

Then, lead wires 14A and 14B each serving as a terminal were connected to lead tabs 15A and 15B provided in anode body 21 and cathode body 22, respectively. It is to be noted that a steel wire coated with copper was used for lead tabs 15A and 15B and lead wires 14A and 14B. Then, the end face of the wound body, that is, the incision corresponding to a cutting plane of anode body 21, was immersed in the adipic acid ammonium solution and subjected to heat treatment at 280° C., thereby forming a dielectric film on the cutting plane of anode body 21 to complete the wound body.

Then, a mixed solution and a monomer solution were prepared. First, 0.1 mol of ferric para-toluenesulfonic acid as a dopant material was added to 85.6 g of n-butanol. Then, 0.0005 mol of para-toluenesulfonic acid benzopyrimidinium as an NHPA compound salt was added to this butanol solution, to prepare a mixed solution. The structure of para-toluenesulfonic acid benzopyrimidinium is represented by Chemical Formula 1. Furthermore, 0.3 mol of 3,4-ethylene dioxythiophene was prepared as a monomer solution. It is to be noted that 3,4-ethylene dioxythiophene was in a liquid state, and accordingly, no solvent was used for the monomer solution.

[Chemical Formula 1]

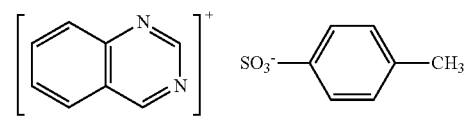

Then, the wound body produced in the above-described process was impregnated with the prepared mixed solution and further impregnated with the monomer solution. Thus, the mole ratio of the monomer (A), para-toluenesulfonic acid benzopyrimidinium (B) and ferric para-toluenesulfonic acid (C) used for polymerization reaction was A:B:C=3:0.005:1. After impregnation, when the chemical polymerization reaction of 3,4-ethylene dioxythiophene was completed, a conductive polymer layer was formed. Capacitor element 10 was produced by the above-described process.

Then, produced capacitor element 10 was housed in an aluminum case as bottomed case 11, and a rubber member as sealing member 12 was disposed on the upper surface of housed capacitor element 10 such that lead wires 14A and 14B passed through the rubber member. The vicinity of the open end of bottomed case 11 was then subjected to pressing in a lateral direction and curling, and a plastic plate as seat plate 13 was disposed in the curled portion. Finally, lead wires 14A and 14B were subjected to pressing and bending followed by aging, thereby producing a solid electrolytic capacitor as shown in FIG. 1.

Example 2

A solid electrolytic capacitor was manufactured by the same method as in Example 1 except that the mixed solution was used which was obtained by adding 0.001 mol of para-toluenesulfonic acid benzopyrimidinium to the butanol solution obtained by adding 0.1 mol of ferric para-toluenesulfonic acid to 85.8 g of n-butanol. The mole ratio of these substances was A:B:C=3:0.01:1.

Example 3

A solid electrolytic capacitor was manufactured by the same method as in Example 1 except that the mixed solution was used which was obtained by adding 0.003 mol of para-toluenesulfonic acid benzopyrimidinium to the butanol solution obtained by adding 0.1 mol of ferric para-toluenesulfonic acid to 86.8 g of n-butanol. The mole ratio of these substances was A:B:C=3:0.03:1.

Example 4

A solid electrolytic capacitor was manufactured by the same method as in Example 1 except that the mixed solution was used which was obtained by adding 0.004 mol of para-toluenesulfonic acid benzopyrimidinium to the butanol solution obtained by adding 0.1 mol of ferric para-toluenesulfonic acid to 87.2 g of n-butanol. The mole ratio of these substances was A:B:C=3:0.04:1.

Example 5

A solid electrolytic capacitor was manufactured by the same method as in Example 1 except that the mixed solution was used which was obtained by adding 0.005 mol of para-toluenesulfonic acid benzopyrimidinium to the butanol solution obtained by adding 0.1 mol of ferric para-toluenesulfonic acid to 87.7 g of n-butanol. The mole ratio of these substances was A:B:C=3:0.05:1.

Example 6

A solid electrolytic capacitor was manufactured by the same method as in Example 1 except that para-toluenesulfonic acid benzopyridazinium was used in place of para-toluenesulfonic acid benzopyrimidinium. The mole ratio of a monomer (A), para-toluenesulfonic acid benzopyridazinium (D) and a ferric para-toluenesulfonic acid (C) used for polymerization was A:D:C=3:0.005:1. The structure of para-toluenesulfonic acid benzopyridazinium is represented by Chemical Formula 2.
[Chemical Formula 2]

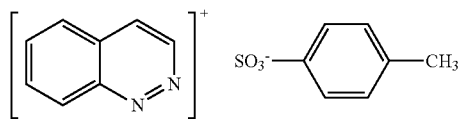

Example 7

A solid electrolytic capacitor was manufactured by the same method as in Example 2 except that para-toluenesulfonic acid benzopyridazinium was used in place of para-toluenesulfonic acid benzopyrimidinium. The mole ratio of these substances was A:D:C=3:0.01:1.

Example 8

A solid electrolytic capacitor was manufactured by the same method as in Example 3 except that para-toluenesulfonic acid benzopyridazinium was used in place of para-toluenesulfonic acid benzopyrimidinium. The mole ratio of these substances was A:D:C=3:0.03:1.

Example 9

A solid electrolytic capacitor was manufactured by the same method as in Example 4 except that para-toluenesulfonic acid benzopyridazinium was used in place of para-toluenesulfonic acid benzopyrimidinium. The mole ratio of these substances was A:D:C=3:0.04:1.

Example 10

A solid electrolytic capacitor was manufactured by the same method as in Example 5 except that para-toluenesulfonic acid benzopyridazinium was used in place of para-toluenesulfonic acid benzopyrimidinium. The mole ratio of these substances was A:D:C=3:0.05:1.

Comparative Example 1

A solid electrolytic capacitor was manufactured by the same method as in Example 1 except that para-toluenesulfonic acid benzopyrimidinium was not added. The mole ratio of these substances was A:C=3:1.

Comparative Example 2

A solid electrolytic capacitor was manufactured by the same method as in Example 3 except that para-toluenesulfonic acid methylbutyl imidazolium was used in place of para-toluenesulfonic acid benzopyrimidinium. The mole ratio of a monomer (A), para-toluenesulfonic acid methylbutyl imidazolium (E) and a ferric para-toluenesulfonic acid (C) used for polymerization was A:E:C=3:0.03:1.

For the purpose of facilitating the comparison among the above-described Examples 1 to 10 and Comparative Examples 1 and 2, substances used in Examples and Comparative Examples, and each mixing ratio of these substances are summarized in Table 1. It is to be noted that 50 solid electrolytic capacitors were produced in each of Examples and Comparative Examples.

TABLE 1

|  | Monomer | Nitrogen-containing Heterocyclic Polyaromatic Compound Salt | Oxidizer/ Dopant Material | Mole Ratio |
|---|---|---|---|---|
| Example 1 | 3,4-ethylene dioxythiophene (A) | para-toluenesulfonic acid benzopyrimidinium (B) | ferric para-toluenesulfonic acid (C) | A:B:C = 3:0.005:1 |
| Example 2 | 3,4-ethylene dioxythiophene (A) | para-toluenesulfonic acid benzopyrimidinium (B) | ferric para-toluenesulfonic acid (C) | A:B:C = 3:0.01:1 |

TABLE 1-continued

|  | Monomer | Nitrogen-containing Heterocyclic Polyaromatic Compound Salt | Oxidizer/ Dopant Material | Mole Ratio |
|---|---|---|---|---|
| Example 3 | 3,4-ethylene dioxythiophene (A) | para-toluenesulfonic acid benzopyrimidinium (B) | ferric para-toluenesulfonic acid (C) | A:B:C = 3:0.03:1 |
| Example 4 | 3,4-ethylene dioxythiophene (A) | para-toluenesulfonic acid benzopyrimidinium (B) | ferric para-toluenesulfonic acid (C) | A:B:C = 3:0.04:1 |
| Example 5 | 3,4-ethylene dioxythiophene (A) | para-toluenesulfonic acid benzopyrimidinium (B) | ferric para-toluenesulfonic acid (C) | A:B:C = 3:0.05:1 |
| Example 6 | 3,4-ethylene dioxythiophene (A) | para-toluenesulfonic acid benzopyridazinium (D) | ferric para-toluenesulfonic acid (C) | A:D:C = 3:0.005:1 |
| Example 7 | 3,4-ethylene dioxythiophene (A) | para-toluenesulfonic acid benzopyridazinium (D) | ferric para-toluenesulfonic acid (C) | A:D:C = 3:0.01:1 |
| Example 8 | 3,4-ethylene dioxythiophene (A) | para-toluenesulfonic acid benzopyridazinium (D) | ferric para-toluenesulfonic acid (C) | A:D:C = 3:0.03:1 |
| Example 9 | 3,4-ethylene dioxythiophene (A) | para-toluenesulfonic acid benzopyridazinium (D) | ferric para-toluenesulfonic acid (C) | A:D:C = 3:0.04:1 |
| Example 10 | 3,4-ethylene dioxythiophene (A) | para-toluenesulfonic acid benzopyridazinium (D) | ferric para-toluenesulfonic acid (C) | A:D:C = 3:0.05:1 |
| Comparative Example 1 | 3,4-ethylene dioxythiophene (A) | — | ferric para-toluenesulfonic acid (C) | A:C = 3:1 |
| Comparative Example 2 | 3,4-ethylene dioxythiophene (A) | para-toluenesulfonic acid methylbutyl imidazolium (E) | ferric para-toluenesulfonic acid (C) | A:E:C = 3:0.03:1 |

Performance Evaluation

The solid electrolytic capacitor in each of Examples and Comparative Examples has a rated voltage of 4 RV and a rated capacitance of 150 nF. Furthermore, the solid electrolytic capacitor has a contour with a diameter of 6.3 mm and a height of 6 mm.

Initial Capacitance

From 50 solid electrolytic capacitors in each of Examples and Comparative Examples, 30 solid electrolytic capacitors were selected at random. Then, an LCR meter of four-terminal type was used to measure the initial capacitance (nF) at a frequency of 120 Hz of each solid electrolytic capacitor. The average of the initial capacitances measured in each of Examples and Comparative Examples is shown in Table 2.

Initial ESR

For 30 solid electrolytic capacitors selected in each of Examples and Comparative Examples, an LCR meter of four-terminal type was used to measure the initial ESR (mΩ) at a frequency of 100 kHz of each solid electrolytic capacitor. The average of the initial ESRs measured in each of Examples and Comparative Examples is shown in Table 2.

Reflow Test

The reflow test was conducted for the solid electrolytic capacitors in each of Examples and Comparative Examples. Specifically, in an environment of 121° C. or higher and 2 atmospheric pressure, the solid electrolytic capacitors of Examples and Comparative Examples each were left for 12 hours to cause forced moisture absorption, and thereafter, the capacitors were kept at a temperature of 230° C. or higher and up to 250° C. for thirty seconds.

Capacitance Change Rate

For each of 30 solid electrolytic capacitors subjected to the reflow test in each of Examples and Comparative Examples, the capacitance was measured by the method as described above to calculate the average thereof. Then, the initial capacitance as C0 and the capacitance obtained after the reflow test as C were substituted into the following equation (1) to calculate a capacitance change rate ΔC (%). The results are shown in Table 2.

$$\Delta C(\%)=(C-C0)/C0\times100 \quad (1)$$

ESR Change Rate

For each of 30 solid electrolytic capacitors subjected to the reflow test in each of Examples and Comparative Examples, the ESR was measured by the method as described above to calculate the average thereof. Then, the initial ESR as R0 and the ESR obtained after the reflow test as R were substituted into the following equation (2) to calculate an ESR change rate ΔR (times). The results are shown in Table 2.

$$\Delta R(\text{times})=R/R0 \quad (2)$$

TABLE 2

|  | Initial Capacitance (μF) | Initial ESR (mΩ) | Capacitance Change Rate ΔC (%) | ESR Change Rate (times) |
|---|---|---|---|---|
| Example 1 | 148 | 34.4 | −4.9 | 1.34 |
| Example 2 | 149 | 32.9 | −4.8 | 1.32 |
| Example 3 | 150 | 32.0 | −3.9 | 1.29 |
| Example 4 | 150 | 31.9 | −3.2 | 1.35 |
| Example 5 | 149 | 33.4 | −4.7 | 1.46 |
| Example 6 | 149 | 34.0 | −5.0 | 1.47 |
| Example 7 | 149 | 32.7 | −3.7 | 1.30 |
| Example 8 | 151 | 29.5 | −2.1 | 1.22 |
| Example 9 | 149 | 30.6 | −4.0 | 1.34 |
| Example 10 | 148 | 33.1 | −5.6 | 1.45 |
| Comparative Example 1 | 149 | 33.3 | −5.5 | 1.45 |
| Comparative Example 2 | 148 | 31.9 | −5.7 | 1.46 |

In Table 2, when comparing Examples 1 to 10 with Comparative Example 1, the solid electrolytic capacitor in each of Examples 1 to 10 was less in capacitance change rate obtained by the reflow test than the solid electrolytic capacitor in Comparative Example 1. Accordingly, it was found that the solid electrolytic capacitor in each of Examples 1 to 10 was less influenced in capacitance by the reflow test, that is, higher in heat resistance, than the solid electrolytic capacitor in Comparative Example 1. Particularly, it was found that, when the added amount of the NHPA compound salt was 0.01 mol or more and 0.04 mol or less with respect to 3 mol of monomer, the solid electrolytic capacitor is less influenced not only in capacitance but also ESR by the reflow test, that is, the solid electrolytic capacitor is relatively high in heat resistance.

Furthermore, in Comparative Example 2, para-toluenesulfonic acid methylbutyl imidazolium, that is, a nitrogen-containing heterocyclic aromatic compound, was used in place of an NHPA compound salt. In this case, the reflow test exerted a great influence on the solid electrolytic capacitor which was accordingly greatly deteriorated in characteristics, as compared to the case in each of Examples 1 to 10.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor comprising:
   an anode body having a surface on which a dielectric film is formed; and
   a conductive polymer layer formed on said dielectric film, said conductive polymer layer including an aromatic sulfonic acid ion and a nitrogen-containing heterocyclic polyaromatic compound ion containing a nitrogen atom as a heteroatom.

2. The solid electrolytic capacitor according to claim 1, wherein said nitrogen-containing heterocyclic polyaromatic compound ion is at least one compound ion of benzopyrimidine, benzopyridazine, acridine, and quinoxaline, and a derivative thereof.

3. The solid electrolytic capacitor according to claim 1, wherein a polymer forming said conductive polymer layer is polyethylene dioxythiophene.

4. A method of manufacturing a solid electrolytic capacitor comprising the steps of:
   forming a dielectric film on a surface of an anode body; and
   forming a conductive polymer layer on said dielectric film by polymerization reaction of a monomer using the monomer, a dopant material and a nitrogen-containing heterocyclic polyaromatic compound containing a nitrogen atom as a heteroatom.

5. The method of manufacturing a solid electrolytic capacitor according to claim 4, wherein said nitrogen-containing heterocyclic polyaromatic compound is at least one compound of benzopyrimidine, benzopyridazine, acridine, and quinoxaline, and a derivative thereof.

6. The method of manufacturing a solid electrolytic capacitor according to claim 4, wherein, in the step of forming said conductive polymer layer, a mole ratio (A/B) of said monomer (A) and said nitrogen-containing heterocyclic polyaromatic compound (B) is 3/0.01 or more and 3/0.04 or less.

7. The method of manufacturing a solid electrolytic capacitor according to claim 4, wherein said dopant material is an aromatic sulfonic acid metal salt and said monomer is 3,4-ethylene dioxythiophene.

\* \* \* \* \*